US011570150B2

(12) United States Patent
Work et al.

(10) Patent No.: US 11,570,150 B2
(45) Date of Patent: Jan. 31, 2023

(54) VPN DEEP PACKET INSPECTION

(71) Applicant: SonicWALL US Holdings Inc., Milpitas, CA (US)

(72) Inventors: Steven C. Work, Seattle, WA (US); Prakash N. Masanagi, Seattle, WA (US); Christopher D. Peterson, Seattle, WA (US)

(73) Assignee: SONICWALL INC., Milpitas, CA (US)

( * ) Notice: Subject to any disclaimer, the term of this patent is extended or adjusted under 35 U.S.C. 154(b) by 509 days.

(21) Appl. No.: 16/590,253

(22) Filed: Oct. 1, 2019

(65) Prior Publication Data

US 2020/0106747 A1 Apr. 2, 2020

Related U.S. Application Data

(63) Continuation of application No. 13/773,475, filed on Feb. 21, 2013, now Pat. No. 10,432,587.

(60) Provisional application No. 61/601,318, filed on Feb. 21, 2012.

(51) Int. Cl.
*H04L 29/06* (2006.01)
*H04L 9/40* (2022.01)

(52) U.S. Cl.
CPC ...... *H04L 63/0272* (2013.01); *H04L 63/0281* (2013.01); *H04L 63/164* (2013.01); *H04L 63/166* (2013.01); *H04L 63/168* (2013.01)

(58) Field of Classification Search
CPC ............. H04L 63/0272; H04L 63/0281; H04L 63/164; H04L 63/166; H04L 63/168
See application file for complete search history.

(56) References Cited

U.S. PATENT DOCUMENTS

| 5,414,833 | A | 5/1995 | Hershey et al. |
| 5,796,942 | A | 8/1998 | Esben |
| 5,945,933 | A | 8/1999 | Kalkstein |
| 6,088,803 | A | 7/2000 | Tso et al. |
| 6,108,782 | A | 8/2000 | Fletcher et al. |
| 6,119,236 | A | 9/2000 | Shipley |

(Continued)

FOREIGN PATENT DOCUMENTS

| EP | 1972096 B1 | 12/2006 |
| EP | 2007082 A1 | 6/2007 |

(Continued)

OTHER PUBLICATIONS

Cascarano, N., Ciminiera, L., & Risso, F. (2011). Optimizing deep packet inspection for high-speed traffic analysis. Journal of Network and Systems Management, 19(1), 7-31. doi:http://dx.doi.org/10.1007/s10922-010-9181-x (Year: 2011).*

(Continued)

*Primary Examiner* — Mahfuzur Rahman
(74) *Attorney, Agent, or Firm* — Polsinelli LLP

(57) ABSTRACT

Policy enforcement previously available for web proxy access methods is extended and applied to layer 3 packets flowing through VPN channels. With these extensions, a common security policy is possible that is enforceable between VPN proxied access and VPN tunneled access. Equivalent security policy to tunnel based VPN access without comprising the inherent performance, scalability and application compatibility advantages tunnel based VPNs have over their proxy based VPN counterparts.

15 Claims, 4 Drawing Sheets

(56) References Cited

U.S. PATENT DOCUMENTS

| | | |
|---|---|---|
| 6,178,448 B1 | 1/2001 | Gray et al. |
| 6,219,706 B1 | 4/2001 | Fan et al. |
| 6,449,723 B1 | 9/2002 | Elgressy et al. |
| 6,789,203 B1 | 9/2004 | Belissent |
| 6,851,061 B1 | 2/2005 | Holland et al. |
| 7,058,821 B1 | 6/2006 | Parekh et al. |
| 7,134,143 B2 | 11/2006 | Stellenberg et al. |
| 7,152,164 B1 | 12/2006 | Loukas |
| 7,185,368 B2 | 2/2007 | Copeland |
| 7,304,996 B1 | 12/2007 | Swenson et al. |
| 7,849,502 B1 | 12/2010 | Bloch et al. |
| 7,881,199 B2 | 2/2011 | Krstulich |
| 8,189,468 B2 | 5/2012 | Bugenhagen |
| 8,339,959 B1 * | 12/2012 | Moisand ............... H04L 45/302 370/235 |
| 9,191,327 B2 | 11/2015 | Shieh |
| 10,432,587 B2 | 9/2019 | Work |
| 2004/0165588 A1 | 8/2004 | Pandya |
| 2005/0185647 A1 * | 8/2005 | Rao ....................... H04L 63/164 370/392 |
| 2006/0120374 A1 * | 6/2006 | Yoshimoto .......... H04L 12/2856 370/392 |
| 2006/0229896 A1 * | 10/2006 | Rosen ................ G06Q 10/1053 705/321 |
| 2007/0153798 A1 | 7/2007 | Krsstulich |
| 2009/0254967 A1 * | 10/2009 | J. ............................ H04L 63/20 726/1 |
| 2010/0037311 A1 | 2/2010 | He et al. |
| 2010/0223458 A1 * | 9/2010 | McGrew ............. H04L 63/0272 713/153 |
| 2011/0286466 A1 * | 11/2011 | Ge ........................ H04L 45/741 370/401 |
| 2012/0005476 A1 | 1/2012 | Wei et al. |
| 2012/0036244 A1 * | 2/2012 | Ramachandra ......... H04L 61/50 709/223 |
| 2012/0096548 A1 * | 4/2012 | Riordan .............. H04L 63/1441 726/23 |
| 2012/0144019 A1 | 6/2012 | Zhu et al. |
| 2012/0173694 A1 * | 7/2012 | Yan ....................... H04L 61/103 709/223 |
| 2013/0014246 A1 * | 1/2013 | Larson .................. H04L 47/805 726/15 |
| 2013/0219486 A1 | 8/2013 | Work |
| 2020/0106747 A1 | 4/2020 | Work |

FOREIGN PATENT DOCUMENTS

| | | |
|---|---|---|
| EP | 1853013 A1 | 11/2007 |
| EP | 2225663 B1 | 11/2008 |
| EP | 2568730 A1 | 12/2010 |

OTHER PUBLICATIONS

U.S. Appl. No. 13/773,475; Final Office Action dated Apr. 16, 2015.
U.S. Appl. No. 13/773,475; Office Action dated Oct. 2, 2014.
U.S. Appl. No. 13/773,475; Final Office Action dated Jun. 16, 2014.
U.S. Appl. No. 13/773,475; Office Action dated Mar. 14, 2014.

* cited by examiner

VPN DEEP PACKET INSPECTION

CROSS REFERENCE TO RELATED APPLICATIONS

This application is a continuation and claims the priority benefit of U.S. patent application Ser. No. 13/773,475 filed Feb. 21, 2013, which claims the priority benefit of U.S. provisional patent application 61/601,318 filed Feb. 21, 2012, the disclosures of which are incorporated herein by reference.

BACKGROUND OF THE INVENTION

1. Field of the Invention

The prevent invention generally relates to network security. More specifically, the present invention relates to Virtual Private Networks and deep packet inspection.

2. Related Art

Tunnel based VPN traffic has been limited to simple layer 3 and layer 4 security policy semantics. Previously, these semantics have not been capable of providing specific network resource level security policy founding layers 5 through 7 of the open systems interconnection (OSI) reference model. There is a need in the art for providing a more secure VPN connection.

SUMMARY OF THE CLAIMED INVENTION

A secure VPN connection is provided based on user identify and a hardware identifier. A client application on client device may establish a VPN connection with a VPN gateway using a request that includes user identification and an equipment identifier. The equipment identifier is an unmutable number that is retrieved from a hardware component of the client device. If the user identifier and hardware identifier are registered, the secure VPN connection is established. If the hardware identifier is not registered with the VPN gateway, the connection may be denied. In some instances, a connection may be established with an unregistered equipment ID based on VPN connection settings.

In an embodiment, a method for establishing a connection begins with receiving a client access request from a client. A client hardware identifier may be compared to a list of hardware identifiers. A level of access may be provided based on the hardware identifier.

DETAILED DESCRIPTION

In the seven layer Open Systems Interconnection (OSI) model of computer networking, several layers of encapsulation exist for a single packet. The layers include a first physical layer, a second data link layer, a third network layer, a fourth transport layer, a fifth session layer, a sixth presentation layer, and a seventh application layer. Hence, the model has layers of encapsulation within a single packet.

Embodiments of the present invention perform deep packet (layers 5-7) inspection on the data traveling through layer 3 VPN. The deep packet inspection through a VPN gateway is performed for the purposes of enforcing network resource access control policies. Such policies include but are not limited to URL level access control enforcement of web traffic and single sign on of specified web resources.

In some embodiments, the present invention extends the policy enforcement previously available for web proxy access methods and applies it to layer 3 packets flowing through VPN channels. With these extensions, a common security policy is possible that is enforceable between VPN proxied access and VPN tunneled access. This invention provides equivalent security policy to tunnel based VPN access without comprising the inherent performance, scalability and application compatibility advantages tunnel based VPNs have over their proxy based VPN counterparts.

Payload data of all packets flowing through a VPN tunnel are inspected. The present technology acts upon security policies including but limited to read only access, no access, and read/write access to network resources found embedded in the payload. The primary purpose of this invention is to enforce network resource security policy of all VPN tunnel traffic flowing through a VPN gateway device. URL access control is enforced within a layer 3 VPN. Single sign-on capabilities are applied to a web service which is transparently being applied to web transactions flowing through a layer 3 VPN.

Figure 1:
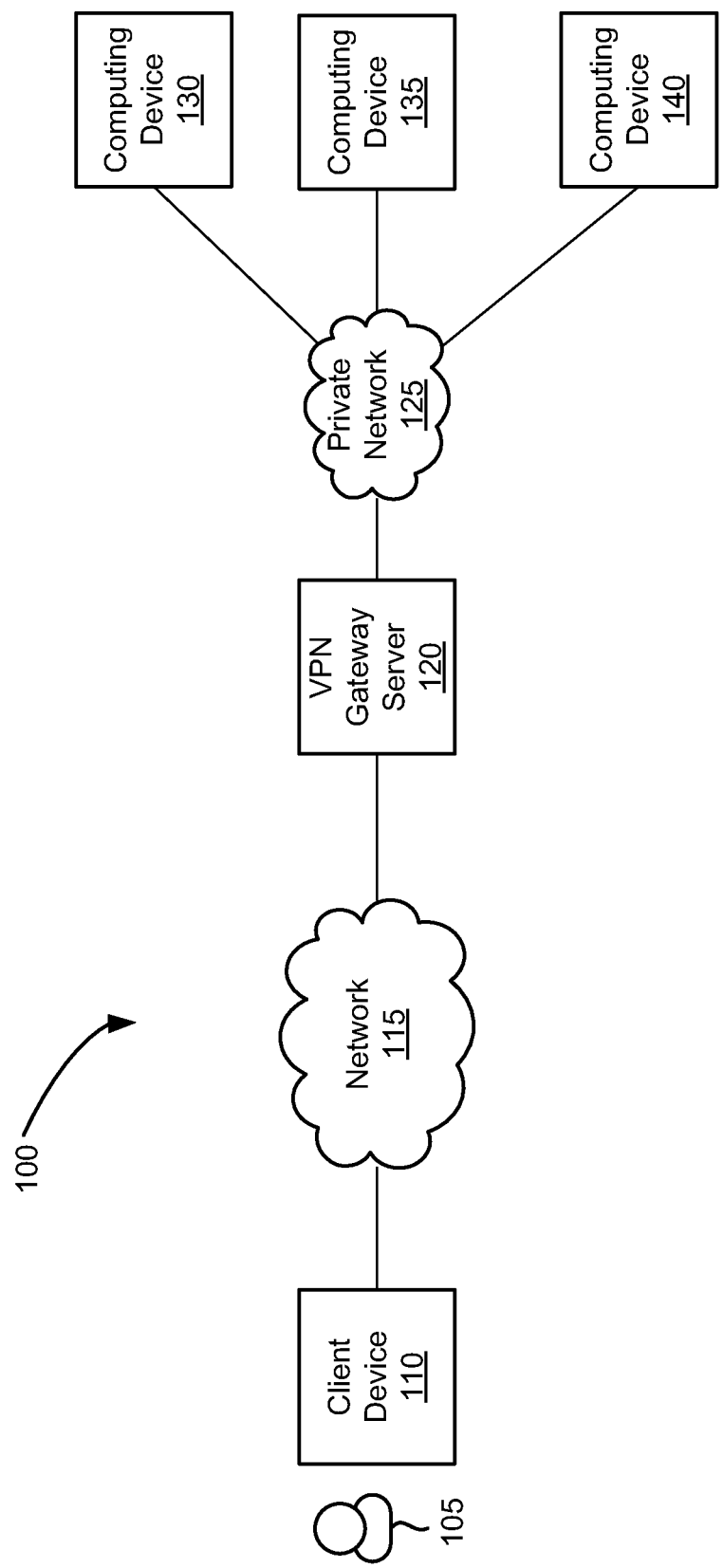
FIG. 1 is a block diagram of a VPN system.

FIG. 1 is a block diagram of a VPN system. The VPN system of FIG. 1 includes client device 110, network 115, VPN gateway server 120, private network 125, and computing devices 130, 135 and 140. Client device 110 may be operated by user 105 and may include a tablet, mobile device, desktop computer, or some other device. Client device 110 may initiate a VPN request with VPN gateway server 120. The VPN request may include user credentials. The user identifier may be stored on client device 110 or received via input from user 105. The request may be received by VPN gateway server 120 over network 115. Client device 110 is discussed in more detail below with respect to FIG. 2.

Network 115 may be a public network, private network, WAN, LAN, intranet, the Internet, a cellular voice network, a cellular data network, and any combination of these networks. Network 115 may send and facilitate communication between client device 110 and VPN gateway server 120. In some embodiments, network 115 may include one or more wireless communication networks and components, such as a cellular, Wi-Fi, Bluetooth, or other wireless communication mechanism.

VPN gateway server 120 may communicate with network 115 and private network 125. VPN gateway server 120 may be implemented as a network server and/or application server which communicates with the Internet. Server 120 may process requests for a secure VPN request. For example, VPN gateway server 120 may receive and process VPN connection requests from client device 110.

Private network 125 may be an intranet or other private network, for example a private network maintained by a business. Computing devices 130, 135 and 140 may be accessible to client device 100 through a secure VPN connection established via VPN gateway server 120.

Figure 2:
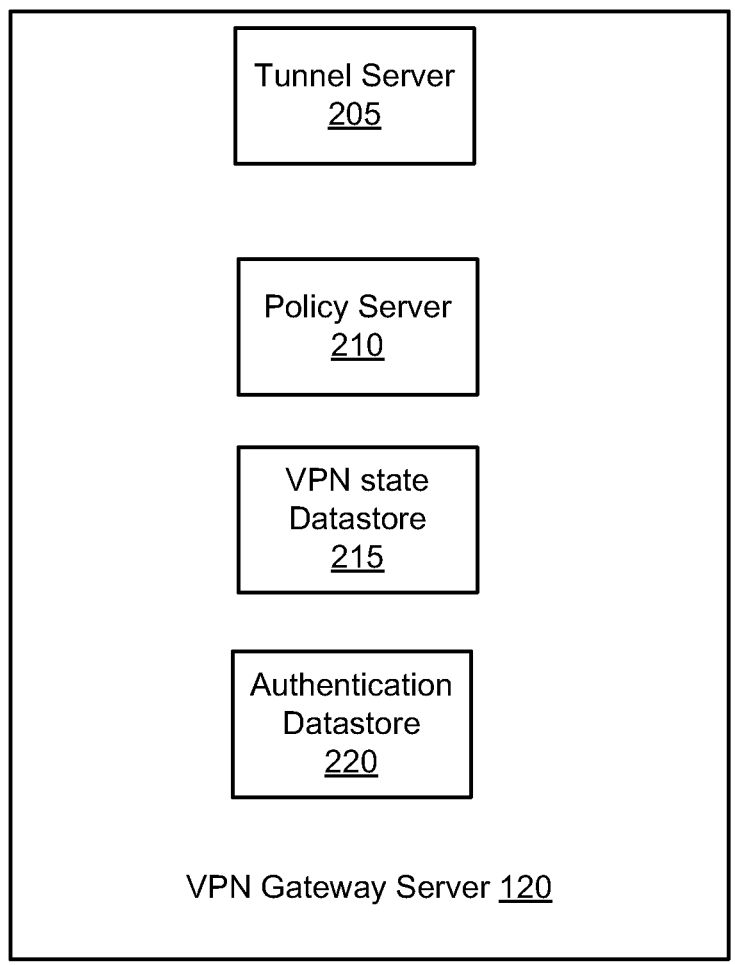
FIG. 2 is a block diagram of a VPN gateway server.

FIG. 2 is a block diagram of a VPN gateway server. VPN gateway server 120 may include processes or subsystems that implement the present technology. For example, an appliance implementing a VPN gateway server may include a tunnel server 205 and a policy server 210. The tunnel server 205 may receive and dispatch network traffic. In embodiments, the tunnel server 205 may act as the policy enforcement point. The policy server 210 may be informed by tunnel server 205 of the user connection and destination and then applies the "policies, business rules, to determine whether the connection is granted or not" to the information. The policy server may act as a policy decision point. The subsystems located on the VPN gateway server may manage secure VPN connections at the VPN gateway server 120. In addition to querying equipment identifiers from data store 315 and further applying policies, business rules, and determine whether connection requests will be granted or not, the sub-systems on VPN gateway server 120 may also maintain various settings for establishing a VPN connection, such as whether a request associated with an unregistered hardware identifier will be allowed.

Data store 215 may be used to store and track the state of a VPN session. Information from data store 215 may be displayed in a management console to allow administrators to observe and manage the state of their VPN appliance.

Authentication data store 220 may contain equipment identifiers and may be accessed from policy server 210. Though data store 220 is illustrated as implemented within an appliance which implements gateway server 120, authentication data store 220 can also be implemented external to the appliance. The data stored in authentication data store 220 may include user identifiers, time stamps related to requests, operations and level of the access allowed for user identifiers, and other data. In some embodiments, a user identifier may be correlated such that a VPN connection requires a user identifier.

Figure 3:
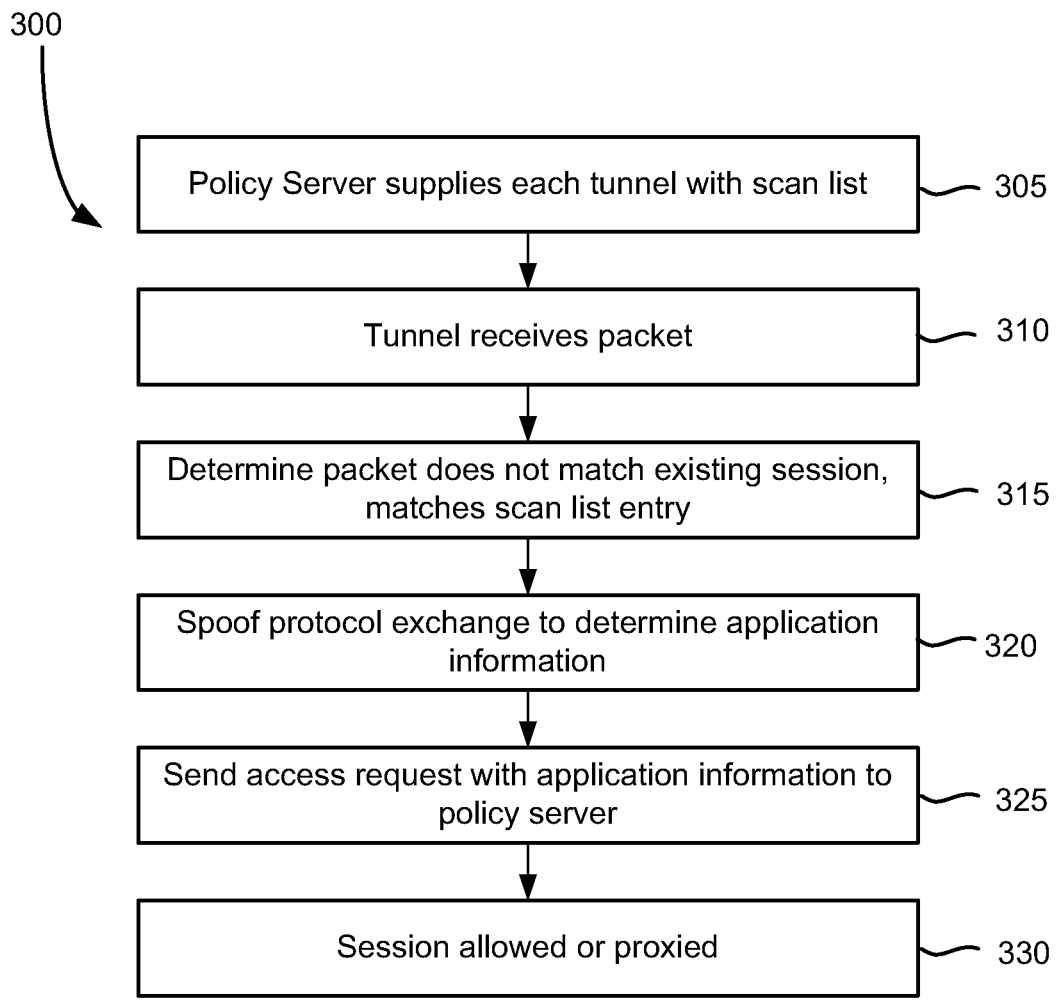
FIG. 3 is a method for providing a secure VPN connection.

FIG. 3 is a method for providing a secure VPN connection. A policy server may supply each tunnel of the VPN with a scan list at step 305. The scan list may be updated periodically and may enumerate address:port tuples that might be associated with access rules requiring application-level information to evaluate (URL rules). The address or port in the scan list may be a wildcard that allows matching any address or port. For example, a tuple may specify a scan list entry which would make *:80 or example.com:* enter the scanner. A tunnel may receive a packet at step 310. A determination may be made that a packet does not match an existing session and does match a scan list entry at step 315.

The present system may determine required application level information by "spoofing" or sending a requests and other information to an originator from a tunnel server and TCP splicing module at step 320. An access request is then sent with application information to a policy server at step 325. The session is then allowed or proxied based on the access request results at step 330. The session may be allowed up to the next application-level request, or proxied to either generate a user-facing service denial message or handle the entire stream for single sign-on purposes. In the event that parsing the application-level payload stream fails, then processing continues with a TCP/IP level access request as if the stream had not matched the scan list initially.

In some embodiments, when the application is handed off to the web proxy server, the connection identifier of the session used by the tunnel is passed along to the proxy server to allow the web proxy server to make policy server requests that return exactly the same results as those made by the tunnel server. In embodiments, the tunnel server may not destroy this connection identifier as the tunnel server will continue to use that identifier as well for the lifetime of the user's tunnel connection.

Figure 4:
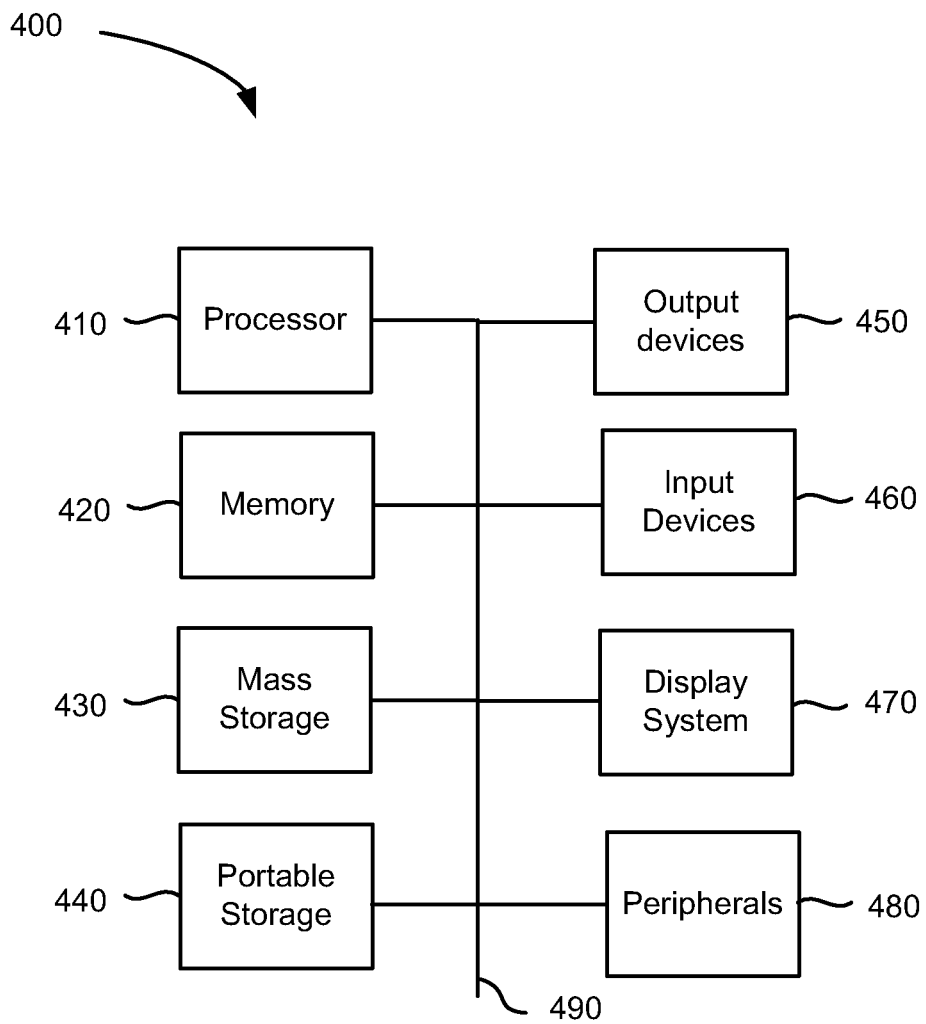
FIG. 4 illustrates a computing system that may be used to implement the present technology.

FIG. 4 illustrates a computing system that may be used to implement the present technology. System 400 of FIG. 4 may be implemented in the contexts of the likes of data store 40, application server 120, network server 40, database 122, and clients 150-160. The computing system 400 of FIG. 4 includes one or more processors 410 and memory 410. Main memory 410 stores, in part, instructions and data for execution by processor 410. Main memory 410 can store the executable code when in operation. The system 400 of FIG. 4 further includes a mass storage device 430, portable storage medium drive(s) 440, output devices 450, user input devices 460, a graphics display 470, and peripheral devices 480.

The components shown in FIG. 4 are depicted as being connected via a single bus 490. However, the components may be connected through one or more data transport means. For example, processor unit 410 and main memory 410 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 410.

Portable storage device 440 operates in conjunction with a portable non-volatile storage medium, such as a floppy disk, compact disk or Digital video disc, to input and output data and code to and from the computer system 400 of FIG. 4. The system software for implementing embodiments of the present invention may be stored on such a portable medium and input to the computer system 400 via the portable storage device 440.

Input devices 460 provide a portion of a user interface. Input devices 460 may include an alpha-numeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Examples of suitable output devices include speakers, printers, network interfaces, and monitors. In some embodiments, input devices 460 and output devices 450 may be implemented as network connections.

Display system 470 may include a liquid crystal display (LCD) or other suitable display device. Display system 470 receives textual and graphical information, and processes the information for output to the display device.

Peripherals 480 may include any type of computer support device to add additional functionality to the computer system. For example, peripheral device(s) 480 may include a modem or a router.

The components contained in the computer system 400 of FIG. 4 are those typically found in computer systems that may be suitable for use with embodiments of the present invention and are intended to represent a broad category of such computer components that are well known in the art. Thus, the computer system 400 of FIG. 4 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for securing a computer network, the method comprising:
   receiving a list at a gateway device that includes device address information corresponding to application-level information allowing a virtual private network (VPN) session to be established with a device matching at least a portion of the device address information;
   receiving a packet at the gateway device, the packet sent over a communication network from an originating device associated with a hardware identifier and a user identifier;
   identifying that the packet does not correspond to an existing VPN session at the gateway device;
   identifying the application-level information of the originating device at the gateway device by spoofing a protocol exchange with the originating device; and
   allowing the VPN session to be established by the gateway device based on at least one of the identified application-level information, the hardware identifier, and the user identifier.

2. The method of claim 1, further comprising:
   identifying that the user identifier and the hardware identifier match authentication information, wherein allowing the VPN session is further based on the user identifier and the hardware identifier matching the authentication information.

3. The method of claim 2, further comprising accessing the authentication information from an authentication data store, wherein traffic associated with the VPN session flows through the gateway device.

4. The method of claim 1, wherein the device address information in the list corresponds to a port, and further comprising sending a communication associated with the VPN session via the port in accordance with the port address information.

5. The method of claim 1, wherein the device address information in the list includes a wildcard corresponding to a plurality of ports over which communications associated with the VPN session are sent.

6. The method of claim 1, wherein allowing the VPN session includes identifying a proxy server to receive communications associated with the VPN session.

7. The method of claim 6, further comprising passing to the proxy server an identifier that allows the proxy server to provide policy server requests.

8. An apparatus for securing a computer network, the apparatus comprising:
   a network interface that:
   receives a list that includes device address information corresponding to application-level information allowing a virtual private network (VPN) session to be established with a device matching at least a portion of the device address information, and
   receives a packet that was sent over a communication network from an originating device associated with a hardware identifier and a user identifier;
   a memory; and
   a processor that executes instruction out of the memory to:
   identify that the packet does not correspond to an existing VPN session,
   identify the application-level information of the originating device by spoofing a protocol exchange with the originating device, and
   allow the VPN session to be established based on at least one of the identified application-level information, the hardware identifier, and the user identifier.

9. The apparatus of claim 8, wherein the processor executes further instructions to identify that the user identifier and the hardware identifier match authentication information, wherein allowing the VPN session is further based on the user identifier and the hardware identifier matching the authentication information.

10. The apparatus of claim 9, further comprising an authentication data store that stores the authentication information, wherein the processor accesses the authentication information from the authentication data store.

11. The apparatus of claim 8, wherein the device address information in the list corresponds to a port, and wherein a communication associated with the VPN session is sent via the port in accordance with the port address information.

12. The apparatus of claim 8, wherein the device address information in the list includes a wildcard corresponding to a plurality of ports over which communications associated with the VPN session are sent.

13. The apparatus of claim 8, wherein the processor allows the VPN session by identifying a proxy server to receive communications associated with the VPN session.

14. The apparatus of claim 13, wherein the network interface passes to the proxy server an identifier that allows the proxy server to provide policy server requests.

15. A non-transitory computer-readable storage medium having embodied thereon a program for implementing a method for securing a computer network, the method comprising:
   receiving a list at a gateway device that includes device address information corresponding to application-level information allowing a virtual private network (VPN) session to be established with a device matching at least a portion of the device address information;
   receiving a packet that was sent over a communication network from an originating device associated with a hardware identifier and a user identifier;
   identifying that the packet does not correspond to an existing VPN session at the gateway device;
   identifying the application-level information of the originating device at the gateway device by spoofing a protocol exchange with the originating device; and
   allowing the VPN session to be established by the gateway device based on at least one of the identified application-level information, the hardware identifier, and the user identifier.

* * * * *